US012624268B2

(12) United States Patent
 Shore

(10) Patent No.: US 12,624,268 B2
(45) Date of Patent: May 12, 2026

(54) SEMI-SOLID BIODEGRADABLE REFRIGERANT GEL

(71) Applicant: Minus Works Inc., Islandia, NY (US)

(72) Inventor: Benjamin Wyckoff Shore, Islandia, NY (US)

(73) Assignee: TEMPERATSURE, LLC, Wilmington, DE (US)

( * ) Notice: Subject to any disclaimer, the term of this patent is extended or adjusted under 35 U.S.C. 154(b) by 542 days.

(21) Appl. No.: 18/142,674

(22) Filed: May 3, 2023

(65) Prior Publication Data

US 2023/0357618 A1 Nov. 9, 2023

Related U.S. Application Data

(60) Provisional application No. 63/338,056, filed on May 4, 2022.

(51) Int. Cl.
| | |
|---|---|
| *C09K 5/06* | (2006.01) |
| *B65D 81/18* | (2006.01) |
| *C08K 13/02* | (2006.01) |
| *C08L 1/28* | (2006.01) |
| *F25D 5/02* | (2006.01) |
| *C08K 3/26* | (2006.01) |
| *C08K 3/30* | (2006.01) |
| *C08K 5/092* | (2006.01) |
| *C08K 5/098* | (2006.01) |

(52) U.S. Cl.
CPC .............. *C09K 5/066* (2013.01); *B65D 81/18* (2013.01); *C08K 13/02* (2013.01); *C08L 1/286* (2013.01); *F25D 5/02* (2013.01); *C08K*

*2003/262* (2013.01); *C08K 2003/3081* (2013.01); *C08K 5/092* (2013.01); *C08K 5/098* (2013.01)

(58) Field of Classification Search
CPC ......... B65D 81/18; C08L 1/286; C08K 13/02; C08K 2003/3081; C08K 2003/262; C08K 5/098; C08K 5/092; C09K 5/066; F25D 5/02; F25D 2303/085
USPC ........................................ 252/76, 74, 73, 71
See application file for complete search history.

(56) References Cited

U.S. PATENT DOCUMENTS

| | | | |
|---|---|---|---|
| 5,502,116 | A | 3/1996 | Noda |
| 6,379,582 | B1 | 4/2002 | Putman |
| 8,474,274 | B2 | 7/2013 | Schalla et al. |
| 2013/0062355 | A1 | 3/2013 | Shulman |
| 2016/0187047 | A1 | 6/2016 | Duong |
| 2018/0099051 | A1* | 4/2018 | Matsumoto .......... A61K 8/8152 |
| 2019/0053545 | A1 | 2/2019 | Cameron et al. |

FOREIGN PATENT DOCUMENTS

WO 2004/052251 A1 6/2004

* cited by examiner

*Primary Examiner* — Jessica Whiteley
(74) *Attorney, Agent, or Firm* — Carter, DeLuca & Farrell LLP

(57) ABSTRACT

A semi-solid biodegradable refrigerant gel and methods of making same are disclosed. The semi-solid biodegradable refrigerant gel includes water, a biodegradable thickening agent, a crosslinking agent, an optional secondary crosslinking agent, and a chelating agent. The semi-solid biodegradable refrigerant gel does not require encasement in a high-barrier containment material.

14 Claims, 7 Drawing Sheets

<u>100</u>

SEMI-SOLID BIODEGRADABLE REFRIGERANT GEL

CROSS REFERENCE TO RELATED APPLICATIONS

The present application claims the benefit of and priority to U.S. provisional application No. 63/338,056, filed on May 4, 2022, the entire contents of which is hereby incorporated by reference in its entirety.

TECHNICAL FIELD

The present disclosure generally relates to a novel form of refrigerant gel which does not require the use of high barrier containment material when keeping perishable or temperature sensitive items in specified temperature ranges. The refrigerant gel is a semi-solid hydrogel constructed from plant-based, biodegradable materials. This form of refrigerant gel obviates the need for high barrier containment material and thereby reduces the need for single-use plastic while enabling the use of low barrier, low environmental impact materials such as paper. Embodiments of this semi-solid biodegradable refrigerant gel may consist of over 97% water and thus may retain excellent phase change material properties associated with water. The nature of this semi-solid refrigerant gel may also prevent leakage that can be common in single-use gel packs that use a liquid refrigerant gel. The nature of this semi-solid refrigerant gel may also provide more shape stability to the cold pack which makes for a more consistent shape when frozen. The nature of this semi-solid refrigerant gel formulation allows for adjustable pot-life that enables the gel to be processed as a liquid before setting into a semi-solid.

BACKGROUND

Unless otherwise indicated herein, the materials described in this section are not prior art to the claims in this application and are not admitted being prior art by inclusion in this section.

The proliferation of eCommerce has resulted in a rapid rise of online generated deliveries and shipments. This trend may also be driving the increased generation of packaging materials and packaging material waste. The shipping of perishables and temperature sensitive items may require more packaging than standard products (i.e., insulation, refrigerant cold packs, box liners) and thus may generate even more waste. As grocery stores and pharmacies move more business online, as well as the rise in delivered meal-kits, prepared meals, and curated food boxes, a sharp rise in packaging waste may be further exacerbated.

Packaging waste and the use of non-renewable, non-recyclable materials may be especially prevalent in the cold pack industry, a subset of the packaging material industry.

Cold packs may be passive refrigerants used to keep payloads within specified temperature ranges. Most cold packs are water based because of the excellent phase change properties of water. Water has a Latent Heat of Fusion of 334 J/g as it changes phase from solid (ice) to liquid. This high Latent Heat of Fusion allows water, through changes in its phase, to absorb a significant amount of heat per unit mass and thus keep elements in its environment cool or cold.

There may be several different forms of cold packs used for shipping perishables including gel packs. A gel pack may consist of a viscous gel, such as a hydrogel, contained in a pouch made with plastic film. For most shipping applications, these gel packs are considered "single-use" and as such, drive demand for single-use plastic and a significant amount of packaging waste.

The typical single-use gel pack pouch is made with flexible plastic film. This flexible plastic film may be a monomaterial consisting of Low Density Polyethylene ("LDPE") or a laminate featuring a combination of LDPE and other flexible plastic materials such as Polyester, Nylon, etc. Flexible plastic film is difficult to recycle in the United States and many other countries as evidenced by the lack of curbside recycling programs. According to the EPA's 2018 study, less than 5% of all #4 Plastic (LDPE) gets recycled, which is significantly lower than the recycle rates of other forms of plastic that are curbside recyclable like High Density Polyethylene ("HDPE").

The typical gel pack is susceptible to leaking. Even with high barrier, high strength plastic encasement, punctures and bursting are common occurrences as the gel pack is often packed in next to objects with sharp corners. Gel packs are widely used in parcel deliveries and thus they are exposed to a challenging shipment environment including jostling, drops, compression, and altitude changes, which can result in bursting and breakages. A typical broken gel pack will leak liquid refrigerant gel into its parcel and onto the payload, potentially resulting in a dissatisfied end-user and a dysfunctional or contaminated product.

The typical gel pack uses a liquid refrigerant gel and thus will take on a frozen shape similar to its shape just before freezing. Gel packs are often shipped in pallet quantities to cold storage facilities where they are frozen. During transit to the cold storage facility, gel packs may shift or lump together, thereby producing a frozen gel pack that has an uneven or irregular shape. Gel pack users often have tight packing requirements for their shipment parcels and irregular shaped gel packs may not fit or may produce uneven cooling effects.

SUMMARY

Existing challenges associated with the foregoing, as well as other challenges, are overcome by the presently disclosed semi-solid biodegradable refrigerant gel contained in low barrier material.

One embodiment of the present disclosure is a semi-solid biodegradable refrigerant gel. The semi-solid biodegradable refrigerant gel includes water; a biodegradable thickening agent, a crosslinking agent, and a chelating agent. The semi-solid biodegradable refrigerant gel is semi-solid and does not require encasement in a high barrier containment material.

In aspects, the semi-solid biodegradable refrigerant gel further includes a secondary crosslinking agent, a preservative, and a pH modifying agent.

In aspects, the gel does not flow or leak.

In aspects, the gel retains the shape of a container where the gel solidified.

In aspects, the gel has a Latent Heat of Fusion >275 J/g and a eutectic point of about 0° Celsius.

In aspects, the gel is encapsulated in a paper material consisting of over 85% fiber content by weight.

In aspects, the biodegradable thickening agent is a cellulose product including sodium carboxymethylcellulose, hydroxyethyl cellulose, ethylhydroxyethyl cellulose, carboxymethyl cellulose, carboxyethylhydroxyethyl cellulose, hydroxypropylhydroxyethyl cellulose, methyl cellulose, methylhydroxylmethyl cellulose, methylhydroxyethyl cellulose, carboxymethylmethyl cellulose, and modified derivatives, and/or combinations thereof.

In aspects, the biodegradable thickening agent is guar gum, xantham gum, starch, alginate, pectin, chitosan, starch grafted acrylamide co-polymer, polyglutamic acid, and/or combinations thereof.

In aspects, the crosslinking agent is an alum compound including aluminum sulfate, potassium aluminum sulfate, sodium aluminum sulfate and ammonium aluminum sulfate, and/or combinations thereof.

In aspects, the chelating agent includes one of citric acid, oxalic acid, malic acid, polyacrylic acid, Nitrilotriacetic acid, EDTA (Ethylenediaminetetraacetic acid), and their respective salts, or combinations thereof.

Another embodiment of the present disclosure includes methods of formulating and making a semi-solid biodegradable refrigerant gel. The method includes providing a chamber and a disperser proximate to the chamber. The method includes depositing a predetermined amount of water into the chamber. The method further includes adding a blend of raw materials to the water via the disperser. The blend of raw materials includes a biodegradable thickening agent, a crosslinking agent, an optional secondary crosslinking agent and a chelating agent. The method includes mixing the blend of raw materials with the water to create a viscous liquid gel. The method further includes filling containers or molds with the viscous liquid gel or encapsulating the viscous liquid gel in an encapsulation material. The method includes allowing the viscous liquid gel to set in the containers or molds or encapsulation material to form the semi-solid gel.

In aspects, the blend of raw materials may further include a preservative and a pH modifying agent.

In aspects, the method further includes freezing the semi-solid gel to create a cold pack.

In aspects, the encapsulation material includes a low-barrier containment material.

In aspects, the low-barrier containment material is roll-stock material and is converted into a pouch or bag during a filling process by sealed seams.

In aspects, the low-barrier containment material is a paper material consisting of over 85% fiber content by weight.

Another embodiment of the present disclosure includes a semi-solid biodegradable refrigerant gel which includes water, sodium carboxymethyl cellulose, aluminum sulfate, sodium aluminum sulfate, sodium benzoate, potassium sorbate, citric acid, and sodium carbonate.

In aspects, the semi-solid biodegradable refrigerant gel includes about 0.86% sodium carboxymethyl cellulose by weight relative to the water, about 0.019% aluminum sulfate by weight relative to the water, about 0.064% sodium aluminum sulfate by weight relative to the water, about 0.139% sodium benzoate by weight relative to the water, about 0.034% potassium sorbate by weight relative to the water, about 0.024% citric acid by weight relative to the water, and about 0.014% sodium carbonate by weight relative to the water.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
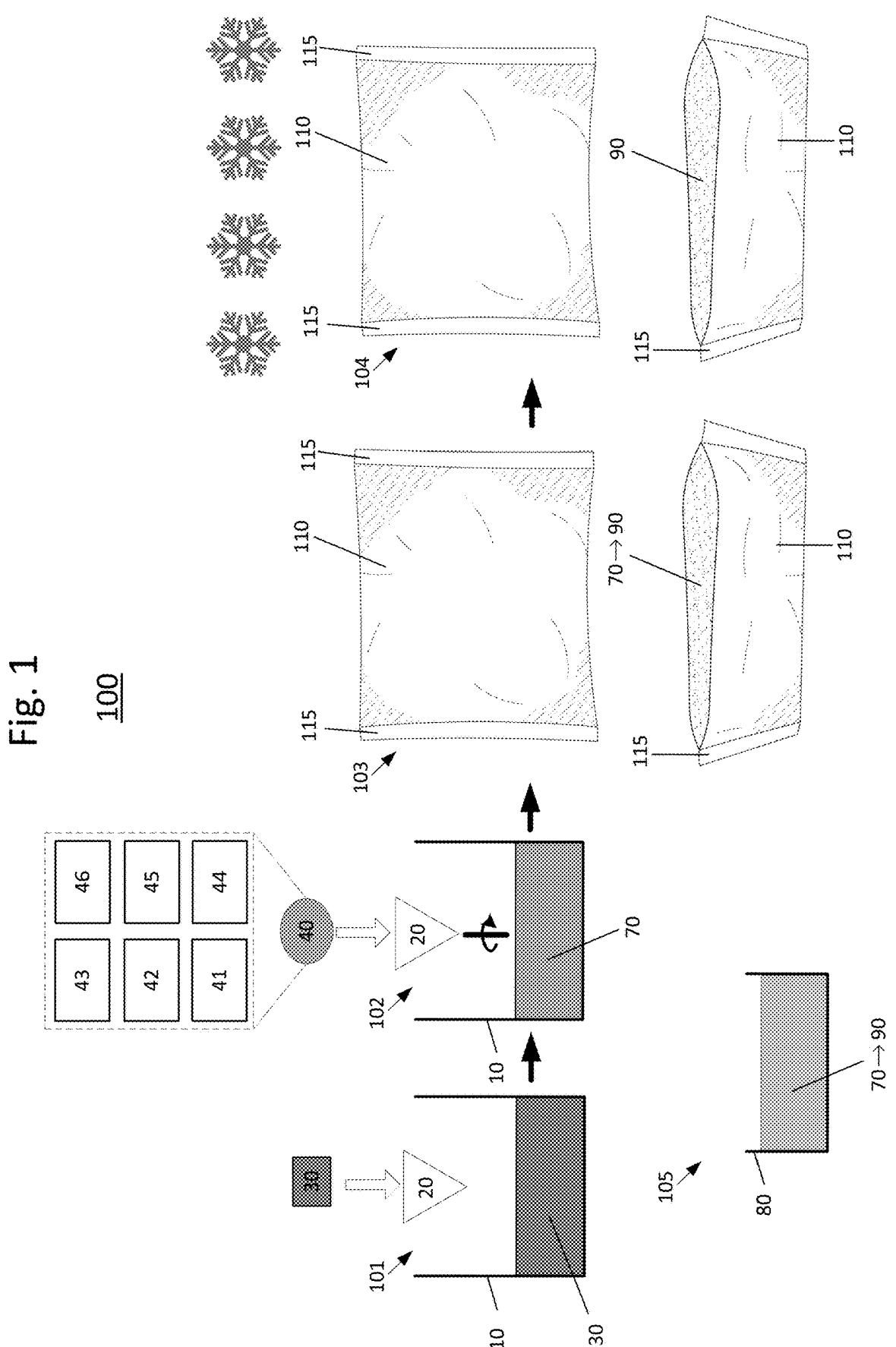
FIG. 1 illustrates an example system or method that can be utilized to produce a semi-solid biodegradable refrigerant gel in accordance with the present disclosure.

The terminology used herein is for the purpose of describing particular embodiments only and is not intended to be limiting of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the disclosure, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the disclosure and the claims.

Novel methods for producing a semi-solid biodegradable refrigerant gel contained in low-barrier material are discussed herein. In the following description, for purposes of explanation, numerous specific details are set forth in order to provide a thorough understanding of the present disclosure. It will be evident, however, to one skilled in the art that the present disclosure may be practiced without these specific details.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure may comprise a semi-solid biodegradable refrigerant gel contained in low-barrier material or no barrier material. The gel may be composed of water, a biodegradable thickening agent, a crosslinking agent, an optional secondary crosslinking agent, a chelating agent, preservatives, and a pH modifying agent to control the rate of the solidifying process. The formed refrigerant gel may be able to solidify to form a semi-solid gel that will not flow or leak and will retain water for an extended period of time. The formed refrigerant gel may also retain the shape of the container where it solidified for a period of time.

FIG. 1 illustrates an example system or method that can be utilized to produce a semi-solid biodegradable refrigerant gel contained in a low-barrier material, arranged in accordance with at least some embodiments presented herein.

System 100 may include a chamber 10 and a disperser 20 proximate to chamber 10. At 101, water 30 may be deposited into chamber 10.

At 102, a blend of powder raw materials 40 may be added to water 30. Blend of powder raw material 40 may be added to water 30 directly, via disperser 20. Disperser 20 may be a mixing and blending apparatus such as an eductor, or dispersing may be performed via any other method of dispersing a powder into a liquid that is known to those skilled in the art. Blend of powder raw materials 40 may be about 0.65% to 10.00% by weight relative to a weight of water 30. Blend of powder raw materials 40 and water 30 may be agitated with a mixer 60 for a period of time to generate a gel 70. Blend of powder raw materials 40 and water 30 may be agitated with mixer 60 until the mixture has bloomed and blend of powder raw materials 40 is fully hydrated in water 30 to form gel 70, a viscous liquid. In embodiments, blend of powder raw materials 40 and water 30 may be agitated with mixer 60 for a period of time of about 1 minute to about 60 minutes.

Blend of powder raw materials 40 may include a biodegradable thickening agent 41, a crosslinking agent 42, an optional secondary crosslinking agent 43, preservatives 44, a chelating agent 45, and a pH modifier 46.

Biodegradable thickening agent 41 may be about 5.00% to about 95.00% by weight relative to blend of powder raw material 40. Biodegradable thickening agent 41 may be a powder but liquified thickening agents may also be contemplated. Biodegradable thickening agent 41 may be non-ionic and may not be affected by a lowered pH. Biodegradable thickening agent 41 may limit a size of ice crystals which may form in a gel. Biodegradable thickening agent 41 may create a more uniform lattice structure in a frozen gel pack, which in turn may require more energy to melt a frozen gel pack and thereby improve performance and ability to absorb heat. In embodiments, biodegradable thickening agent 41 may be a cellulose product such as sodium carboxymethylcellulose, hydroxyethyl cellulose, ethylhydroxyethyl cellulose, carboxymethyl cellulose, carboxyethylhydroxyethyl cellulose, hydroxypropylhydroxyethyl cellulose, methyl cellulose, methylhydroxylmethyl cellulose, methylhydroxyethyl cellulose, carboxymethylmethyl cellulose, and modified derivatives and combinations thereof. Biodegradable thickening agent 41 may have a degree of substitution in the range of 0.25 to 2.5. In still further embodiments, biodegradable thickening agent 41 may be guar gum, xantham gum, starch, alginate, pectin, chitosan, starch grafted acrylamide co-polymer, polyglutamic acid, and/or combinations thereof.

Crosslinking agent 42 may be about 1.00% to 75.00% by weight relative to blend of powder raw materials 40. Crosslinking agent 42 may dissolve in water to create a multi-valent cation and an acid. The multi-valent cation produced by the dissolution of crosslinking agent 42 may bond with the multiple functional groups of the biodegradable thickening agent 41 thereby creating linkages of multiple polymer chains of biodegradable thickening agent 41 and producing higher molecular weight molecules, a higher viscosity, and a more structured gel. The acid component of the dissolved crosslinking agent 42 may contribute to a reduction in the system pH. The crosslinking reaction and gelation may be triggered by a lowering of pH. As the pH is lowered, the functional groups of the biodegradable thickening agent 41 may be more likely to become protonated and thus become more reactive, especially with positively charged crosslinking agent 42, forming covalent bonds. In embodiments, crosslinking agent 42 may be an alum compound such as aluminum sulfate, potassium aluminum sulfate, sodium aluminum sulfate, ammonium aluminum sulfate, and/or combinations thereof. In embodiments, crosslinking agent 42 may be aluminum chloride, aluminum nitrate, aluminum citrate, aluminum acetate, and/or combinations thereof.

Secondary crosslinking agent 43 may be about 0.00% to 75.00% by weight relative to blend of powder raw materials 40. Secondary crosslinking agent 43 may dissolve in water to create a multi-valent cation and an acid. In embodiments, secondary crosslinking agent 43 may be an alum compound such as aluminum sulfate, potassium aluminum sulfate, sodium aluminum sulfate, ammonium aluminum sulfate, and/or combinations thereof. In embodiments, secondary crosslinking agent 43 may be aluminum chloride, aluminum nitrate, aluminum citrate, aluminum acetate, and/or combinations thereof. Secondary crosslinking agent 43 may be used in concert with primary crosslinking agent 42 to tune the pot-life and gelation time of gel 70. By combining crosslinking agents of different dissolution rates a specific pot-life can be achieved. The dissolution rate of the crosslinking agent may affect the rate of pH decrease, which in turn affects the rate of crosslinking reaction. As shown in Table 1 a greater proportion of slower acting crosslinking agents will allow for a longer pot-life. Examples 1 and 2 include the largest amount of sodium aluminum sulfate as secondary crosslinking agent 43 and resulted in gel 70 with the longest pot-life of 24 and 12 hours respectively.

TABLE 1

| | Component | Example 1 | | Example 2 | | Example 3 | | Example 4 | | Example 5 | |
|---|---|---|---|---|---|---|---|---|---|---|---|
| | | Component Weight (oz) | % of Total Solids | Component Weight (oz) | % of Total Solids | Component Weight (oz) | % of Total | Component Weight (oz) | % of Total | Component Weight (oz) | % of Total |
| Thickening Agent | NaCMC | 2.300 | 74.6% | 2.300 | 75.1% | 2.300 | 75.4% | 2.400 | 81.6% | 3.10 | 76.2% |
| Cross-linker 1 | Aluminum Sulfate | 0.050 | 1.6% | 0.080 | 2.6% | 0.120 | 3.9% | 0.200 | 6.8% | 0.40 | 9.8% |
| Cross-linker 2 | Sodium Aluminum Sulfate | 0.170 | 5.5% | 0.120 | 3.9% | 0.070 | 2.3% | | 0.0% | | 0.0% |
| Pre-servative 1 | Sodium Benzoate | 0.370 | 12.0% | 0.370 | 12.1% | 0.370 | 12.1% | 0.260 | 8.8% | 0.45 | 11.1% |
| Pres-ervative 2 | Potassium Sorbate | 0.090 | 2.9% | 0.090 | 2.9% | 0.090 | 2.9% | | 0.0% | | 0.0% |
| Chelating Agent | Citric Acid | 0.065 | 2.1% | 0.065 | 2.1% | 0.065 | 2.1% | 0.040 | 1.4% | 0.08 | 2.0% |
| pH Modifier | Sodium Carbonate | 0.037 | 1.2% | 0.037 | 1.2% | 0.037 | 1.2% | 0.040 | 1.4% | 0.04 | 1.0% |
| Total Solids | | 3.082 | 100.0% | 3.062 | 100.0% | 3.052 | 100.0% | 2.940 | 100.0% | 4.07 | 100.0% |
| Total Solids to Water % | | 1.15% | | 1.15% | | 1.14% | | 1.10% | | 1.53% | |
| Ratio of Crosslinker 1:Crosslinker 2 | | 0.29 | | 0.67 | | 1.71 | | n/a | | n/a | |
| Initial Viscosity (cps)[1] | | 8175 | | 12050 | | 22000 | | 45000 | | 86000 | |
| Intial pH[2] | | 6.55 | | 6.40 | | 5.9 | | 5.38 | | 4.90 | |
| Final pH[2] | | 5.68 | | 5.59 | | 5.24 | | 5.14 | | 4.90 | |
| Time to Gelation (hrs)[3] | | 24 | | 12 | | 8 | | 4 | | 3 | |
| Final Gel Firmness[4] | | Medium | | Medium | | High | | High | | Very High | |

Notes:

Examples above are demonstrative formulations mixed with 2 gallons of water (baseline pH of 6.8 to 7.5) under high shear (1200+ rpm) for 5 minutes. Solids were blended together first and then added to the water at the same time.

[1]Viscosity Measured Brookfield LVTD-I+ Viscometer, Spindle #4, RPM: 30. Measurement taken 15 minutes after completion of mix process.

[2]Initial pH taken 5 minutes after completion of mix process. Final pH taken at final gelation, as measured by the Cup Test. Food/Dough pH probe tip is used to take pH of a semi-solid.

[3]Time to Gelation is measured in hours. Full gelation is accounted for by applying the "Cup Test" as defined by the following:

[4]Final Gel Firmness, while subjective, roughly equated to the following: Low = Young's Modulus of (<10 kPa), Medium (10 to 49 kPa), High (50 to 99 kPa), Very High (99+ kPa)

Preservatives 44 may be about 0.00% to 70.00% by weight relative to blend of powder raw materials 40. Preservatives 44 may target a certain spectrum of microbe, may act synergistically with a thickener to enhance viscosity, and may function as an ice nucleating agent to achieve a faster freeze. In embodiments, preservatives 44 may not be needed, especially if gel 90 will be frozen immediately. In embodiments, preservatives 44 may be sodium benzoate. In other embodiments, preservatives 44 may be potassium sorbate, salts of sorbic acid and benzoic acid, sodium nitrate and other salts of nitric acid, salts of propionic acid, sodium bisulfite, potassium bisulfite, nisin peptide, citric acid, acetic acid, and/or combinations thereof.

A chelating agent 45 may be about 0.50% to 35.00% by weight relative to blend of powder raw materials 40. Chelating agent 45 may bind with the metallic cations produced by crosslinking agent 42 and secondary crosslinking agent 43 in water and provide for a more controlled diffusion of the cations in the mixture, which reduces the risk of localized or uneven crosslinking. Uneven crosslinking may result in clumps or agglomerates and phase separation. In embodiments, chelating agent 45 may be citric acid. In other embodiments, chelating agent 45 may be oxalic acid, malic acid, polyacrylic acid, Nitrilotriacetic acid, EDTA (Ethylenediaminetetraacetic acid), and their respective salts, and/or combinations thereof.

A pH modifying agent 46 may be about 0.00% to 25.00% by weight relative to blend of powder raw materials 40. PH modifying agent 46 may regulate a rate of crosslinking reaction. An amount of pH modifying agent 46 in blend of powder raw material 40 may be increased to slow the rate of the crosslinking reaction or may be decreased to increase the rate of the crosslinking reaction. In embodiments, pH modifying agent 46 may not be needed if a very rapid crosslinking reaction is desired. In embodiments pH modifying agent 46 may be sodium bicarbonate, sodium carbonate, sodium hydroxide, potassium hydroxide, and/or combinations thereof. A pH of gel 70 may be above 4.0.

At 103, gel 70 may be filled into low-barrier containment material 110 by a liquid filling process known in the art, such as, for example Vertical-Form-Fill and Seal. Material 110 may be a rollstock material that is converted into a pouch or bag during the filling process by sealed seams 115. Pouches formed by material 110 may be used to allow gel 70 to set and form semi-solid gel 90 in certain shapes and weights. Polymers in gel 70 may crosslink when gel 70 sets and solidifies into semi-solid gel 90. Semi-solid gel 90 may be a biodegradable refrigerant gel and function as a passive refrigerant when frozen. Semi-solid gel 90 may be composed of over 97% water, allowing semi-solid gel 90 to retain excellent phase change material properties of water and providing use as a passive refrigerant for the cold chain industry. Semi-solid gel 90 may have excellent phase change material properties including a latent heat of fusion >275 J/g and a eutectic point of about 0° Celsius. The semi-solid gel 90 may be encapsulated in material 110 for aesthetic purposes or for condensation prevention purposes rather than performance or barrier purposes. The semi-solid gel 90 may be semi-solid and not require encasement in a high barrier containment material such as plastic and may be contained in a low barrier material such as paper. In embodiments material 110 may be a paper-based material consisting of over 85% fiber content by weight. In embodiments material 110 may be paper, plastic-lined paper, paper coated with a barrier material such as acrylic, paper coated with a bio-based barrier material such as wax, non-woven natural fiber materials, woven natural fiber-based materials or other materials such as LDPE, polypropylene (PP), polyamide (PA), polyester (PET), high density polyethylene (HDPE), polylactic acid (PLA), polyvinyl alcohol (PVA/PVOH), cellulose, polyethylene vinyl acetate (PEVA), cellulose di-acetate and combinations thereof including recycled versions of the above listed materials.

Over a period of time, gel 70 will set and solidify, caused by the crosslinking reaction to form semi-solid gel 90.

At 104, the semi-solid gel 90 may be frozen.

The semi-solid gel 90 may be frozen and placed in packages used to keep perishables at refrigerated or frozen temperatures. Semi-solid gel 90 may thaw over time in a phase change reaction that will absorb the heat of its environment, thereby keeping its surrounding elements cool or cold. As the frozen semi-solid gel 90 thaws, it may not melt into a liquid and may retain its semi-solid gel form.

Optionally, at 105, gel 70 may be poured into containers 80 (FIG. 2) that may be used to allow gel 70 to set and form semi-solid gel 90 in certain shapes and weights. Containers 80 may be filled by a process known in the art, such as, for example, an automated filling process. Container 80 may be made from a material that is flexible, allowing semi-solid gel 90 to be removed easily after gel 70 has set and solidified into semi-solid gel 90. Polymers in gel 70 may crosslink when gel 70 sets and solidifies into semi-solid gel 90. Semi-solid gel 90 may be a biodegradable refrigerant gel and function as a passive refrigerant when frozen. Semi-solid gel 90 may be composed of over 97% water, allowing semi-solid gel 90 to retain excellent phase change material properties of water and providing use as a passive refrigerant for the cold chain industry. Semi-solid gel 90 may have excellent phase change material properties including a latent heat of fusion >275 J/g and a eutectic point of around 0° Celsius. Container 80 may be made from a material, such as for example, silicone, high density polyethylene, low density polyethylene, molded fiber, molded pulp, aluminum, steel, coated corrugated, polypropylene, rubber, that can be used to mold the gel 70 into a desired shape.

The above process may be performed in batches of large volume as long as the weight percentages of the component materials are consistent.

In embodiments, gel 90 may be a semi-solid biodegradable refrigerant gel and may comprise water, a biodegradable thickening agent, a primary and secondary crosslinking agent, preservatives, a chelating agent and a pH modifier. In embodiments, semi-solid biodegradable refrigerant gel 90 may include water, sodium carboxymethyl cellulose, aluminum sulfate, sodium aluminum sulfate, sodium benzoate, potassium sulfate, citric acid, and sodium carbonate. In other embodiments, biodegradable refrigerant gel 90 may include water, about 0.86% sodium carboxymethyl cellulose by weight relative to the water, about 0.019% aluminum sulfate by weight relative to the water, about 0.064% sodium aluminum sulfate by weight relative to the water, about 0.139% sodium benzoate by weight relative to the water, about 0.034% potassium sorbate by weight relative to the water, about 0.024% citric acid by weight relative to the water, and about 0.014% sodium carbonate by weight relative to the water.

The above percentages may be increased relative to the water as long as the percentages of ingredients stay proportional to each other. Increasing the percentages relative to the water will result in a firmer final gel.

As a representative example, in embodiments, 350 gallons of semi-solid biodegradable refrigerant gel 90 may comprise about 2,919 lbs. of water, about 25.2 lbs. of sodium carboxymethyl cellulose, 0.547 lbs. of aluminum sulfate, 1.860 lbs. of sodium aluminum sulfate, 4.0 lbs. of sodium benzoate, 1.0 lbs. of potassium sorbate, 0.7 lbs. of citric acid, 0.4 lbs. of sodium carbonate.

TABLE 2

| Example Semi-Solid Biodegradable Refrigerant gel - 350 gallon batch | | |
| --- | --- | --- |
| Component | Percent of Water | Weight (lbs.) |
| Water | 100 | 2919.000 |
| Sodium Carboxymethyl Cellulose | 0.862 | 25.156 |
| Aluminum Sulfate | 0.019 | 0.547 |
| Sodium Aluminum Sulfate | 0.064 | 1.860 |
| Sodium Benzoate | 0.139 | 4.047 |
| Potassium Sorbate | 0.034 | 0.984 |
| Citric Acid | 0.024 | 0.711 |
| Sodium Carbonate | 0.014 | 0.405 |

Figure 2:
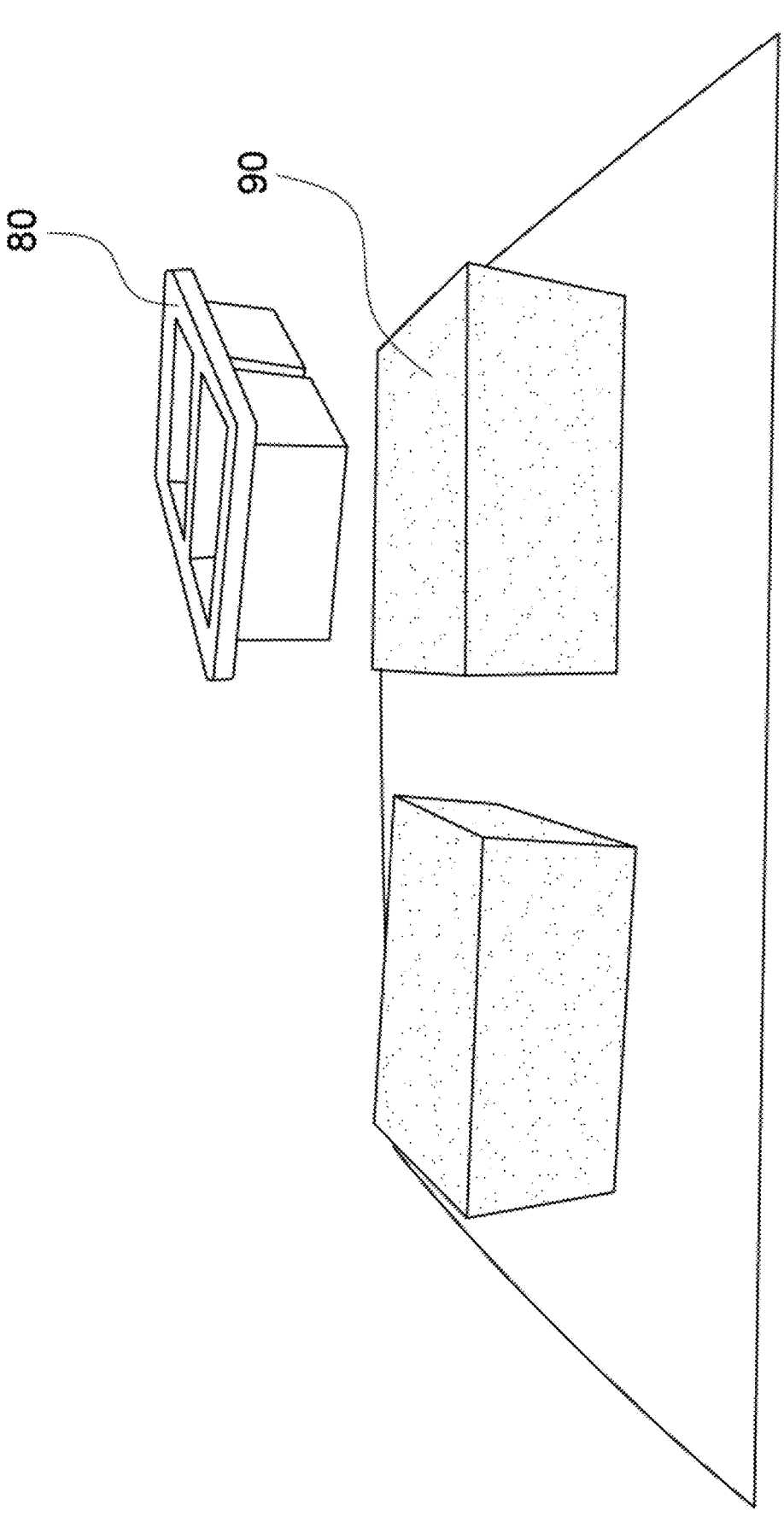
FIG. 2 is a side view of a containment-free, semi-solid biodegradable refrigerant gel and a container in accordance with the present disclosure.

FIG. 2 is a side view of semi-solid biodegradable refrigerant gel after the gel has been crosslinked, and a container, arranged in accordance with at least some embodiments presented herein. Those components in FIG. 2 that are labeled identically to components of FIG. 1 will not be described again for the purposes of brevity. As shown in FIG. 2, biodegradable refrigerant gel 90 may be semi-solid and may not flow or leak. Gel 90 may not require encasement in a high-barrier containment material such as single-use plastic. Gel 90 may be composed of over 97% water, allowing gel 90 to retain the excellent phase change material properties of water and providing use as a passive refrigerant for the cold chain industry. Once set, gel 90 may take on the shape of its mold or container and although it will retain some elasticity and flexibility when unfrozen, it will resist the tendency to lump or deform before freezing. This shape memory may reduce the likelihood of freezing in an irregular or uneven shape. Container 80 may be made from a flexible material and may allow semi-solid gel 90 to be easily removed from container 80.

Figure 3:
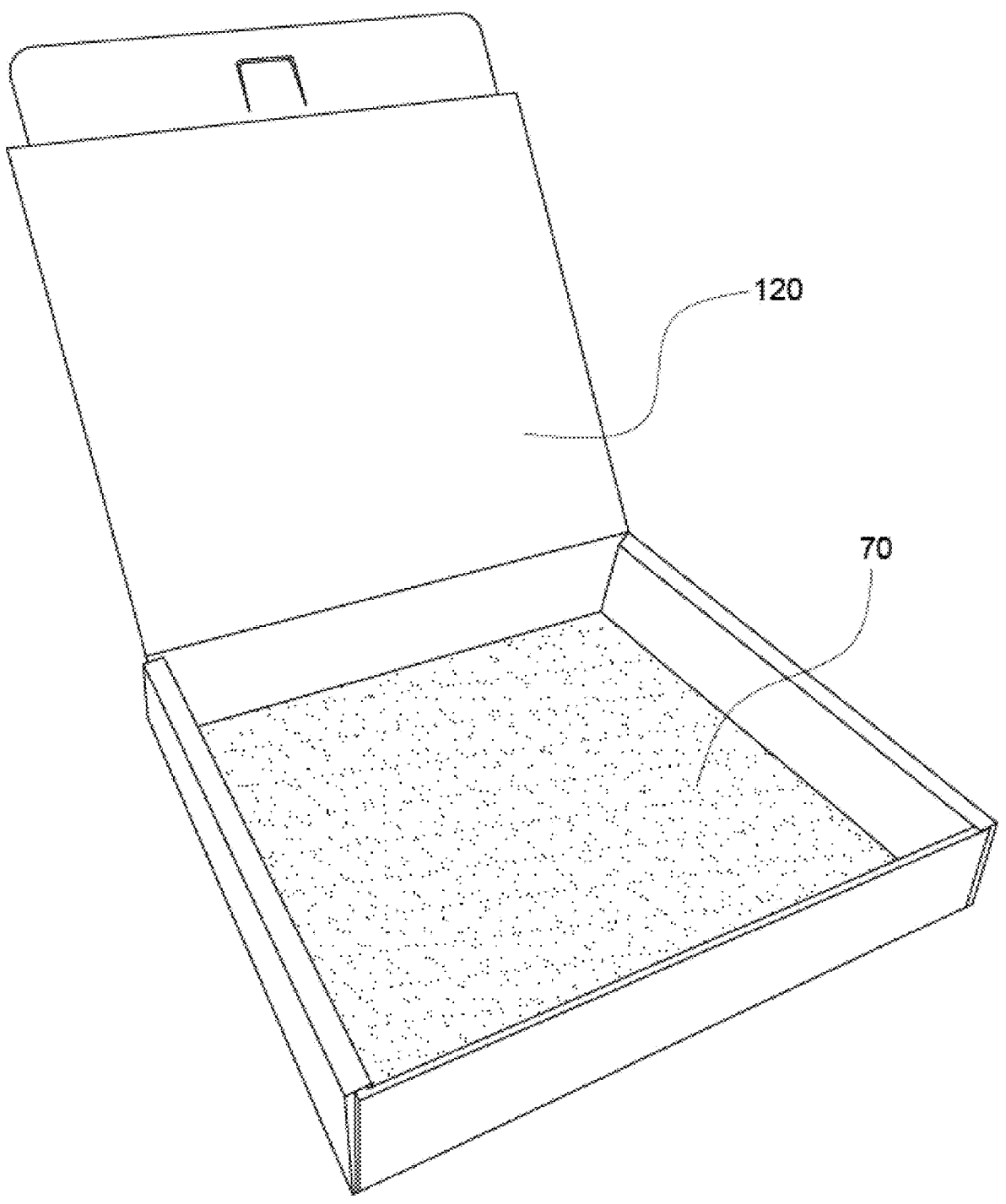
FIG. 3 is a side view of a corrugated container filled with a semi-solid biodegradable refrigerant gel to produce a thermal insulation panel combined with a passive refrigerant in accordance with the present disclosure.

FIG. 3 is a side view of corrugated container 120 filled with a semi-solid biodegradable refrigerant gel 70 to produce a thermal insulation panel combined with a passive refrigerant, arranged in accordance with at least some embodiments presented herein. Those components in FIG. 3 that are labeled identically to components of FIGS. 1-2 will not be described again for the purposes of brevity. As shown in FIG. 3, gel 70 may be poured into corrugated container 120 to produce a thermal insulation panel. Gel 70 may set into semi-solid gel 90 within corrugated container 120.

Figure 4:
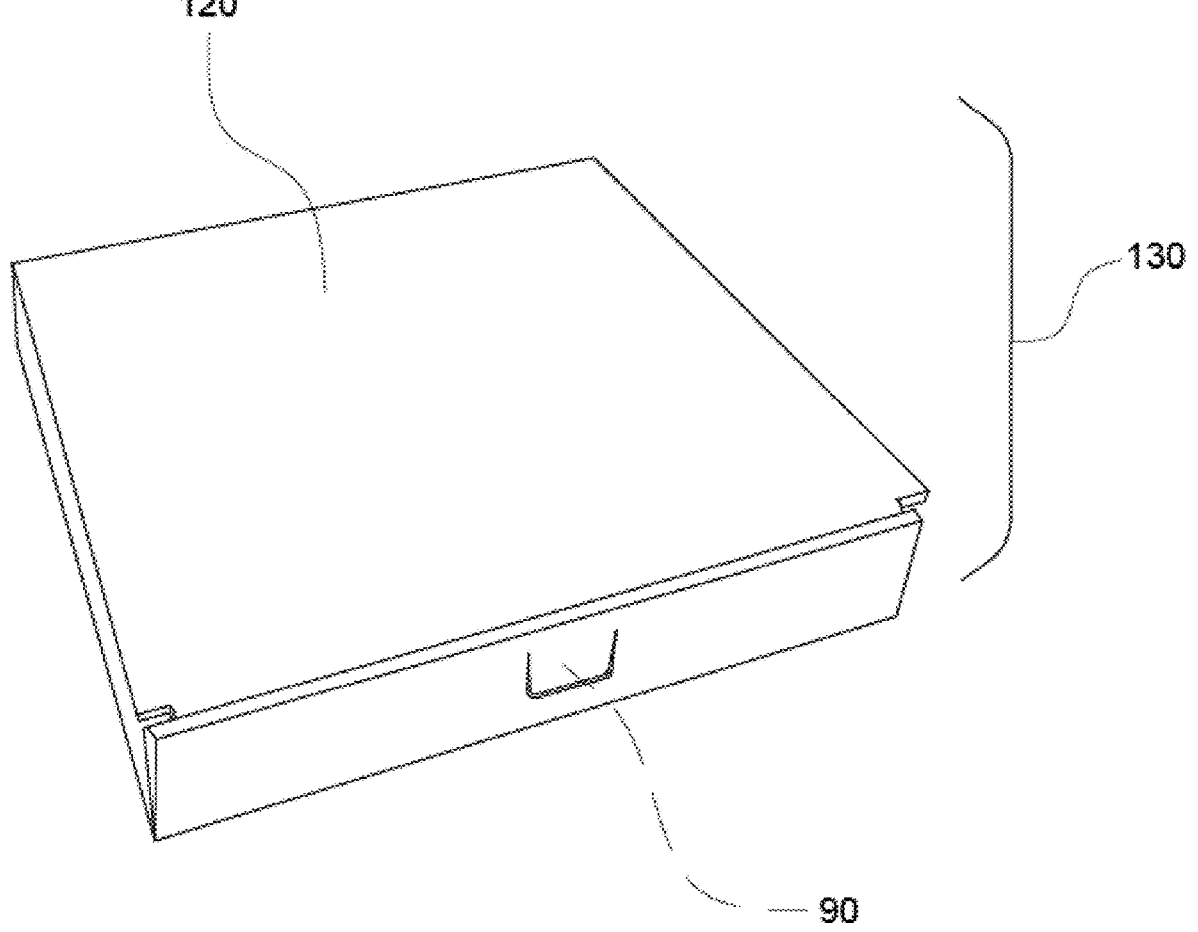
FIG. 4 is a side view of a corrugated container filled with a semi-solid biodegradable refrigerant gel to produce a thermal insulation panel combined with a passive refrigerant in accordance with the present disclosure.

FIG. 4 is a side view of corrugated container 120 filled with a semi-solid biodegradable refrigerant gel 90 to produce a thermal insulation panel 130 combined with a passive refrigerant, arranged in accordance with at least some embodiments presented herein. Those components in FIG. 4 that are labeled identically to components of FIGS. 1-3 will not be described again for the purposes of brevity. As shown in FIG. 3, corrugated container 120 may be closed and sealed over semi-solid gel 90 to produce a thermal insulation panel 130.

Figure 5:
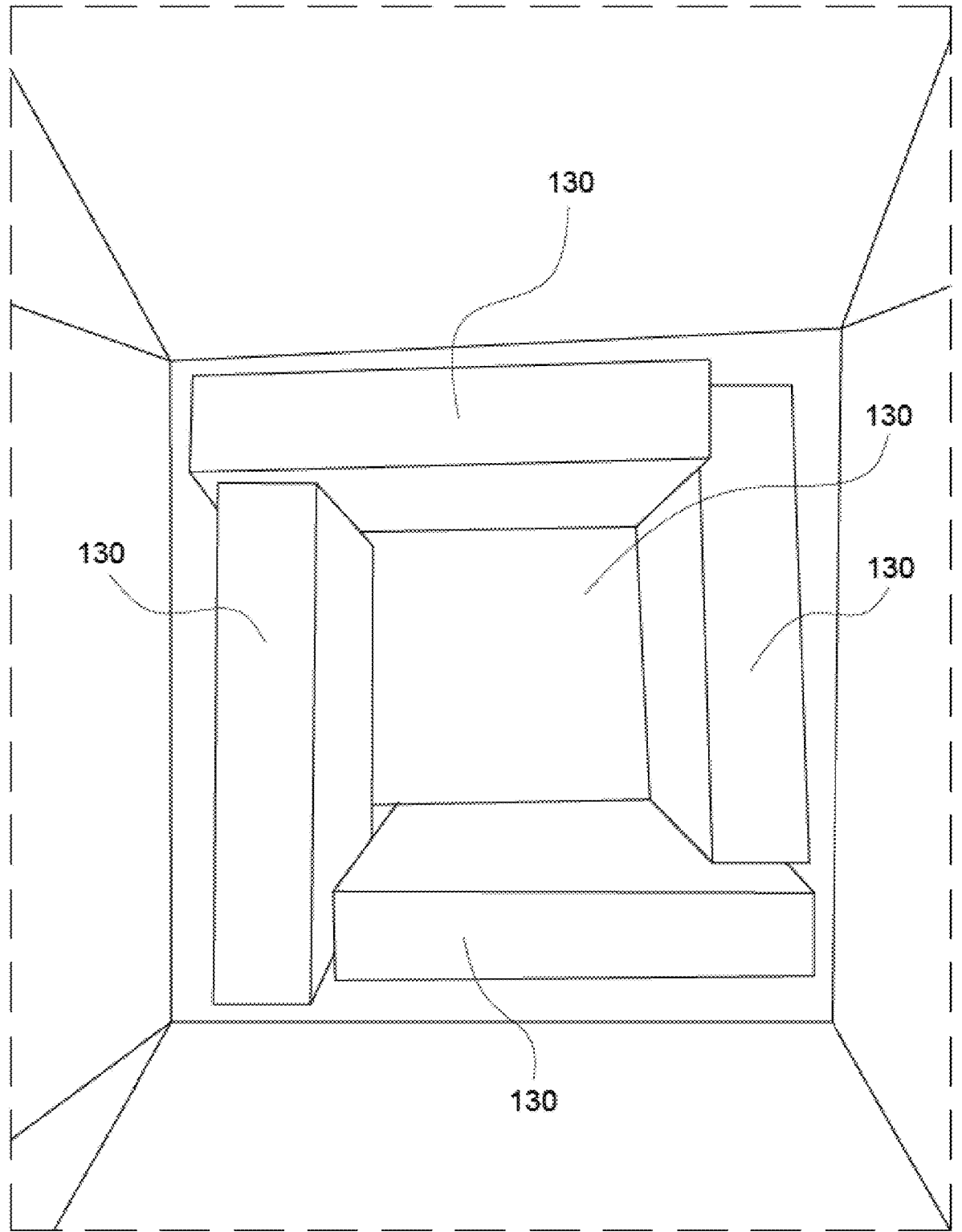
FIG. 5 is a top view of thermal insulation panels filled with a semi-solid biodegradable refrigerant gel arranged to encapsulate a perishable payload without the top panel in accordance with the present disclosure.

FIG. 5 is a top view of thermal insulation panels filled with a semi-solid biodegradable refrigerant gel arranged to encapsulate a perishable payload without the top panel, arranged in accordance with at least some embodiments presented herein. Those components in FIG. 5 that are labeled identically to components of FIGS. 1-4 will not be described again for the purposes of brevity. As shown in FIG. 5, thermal insulation panels 130 may be arranged within an overpack box to form an area to encapsulate a perishable payload.

Figure 6:
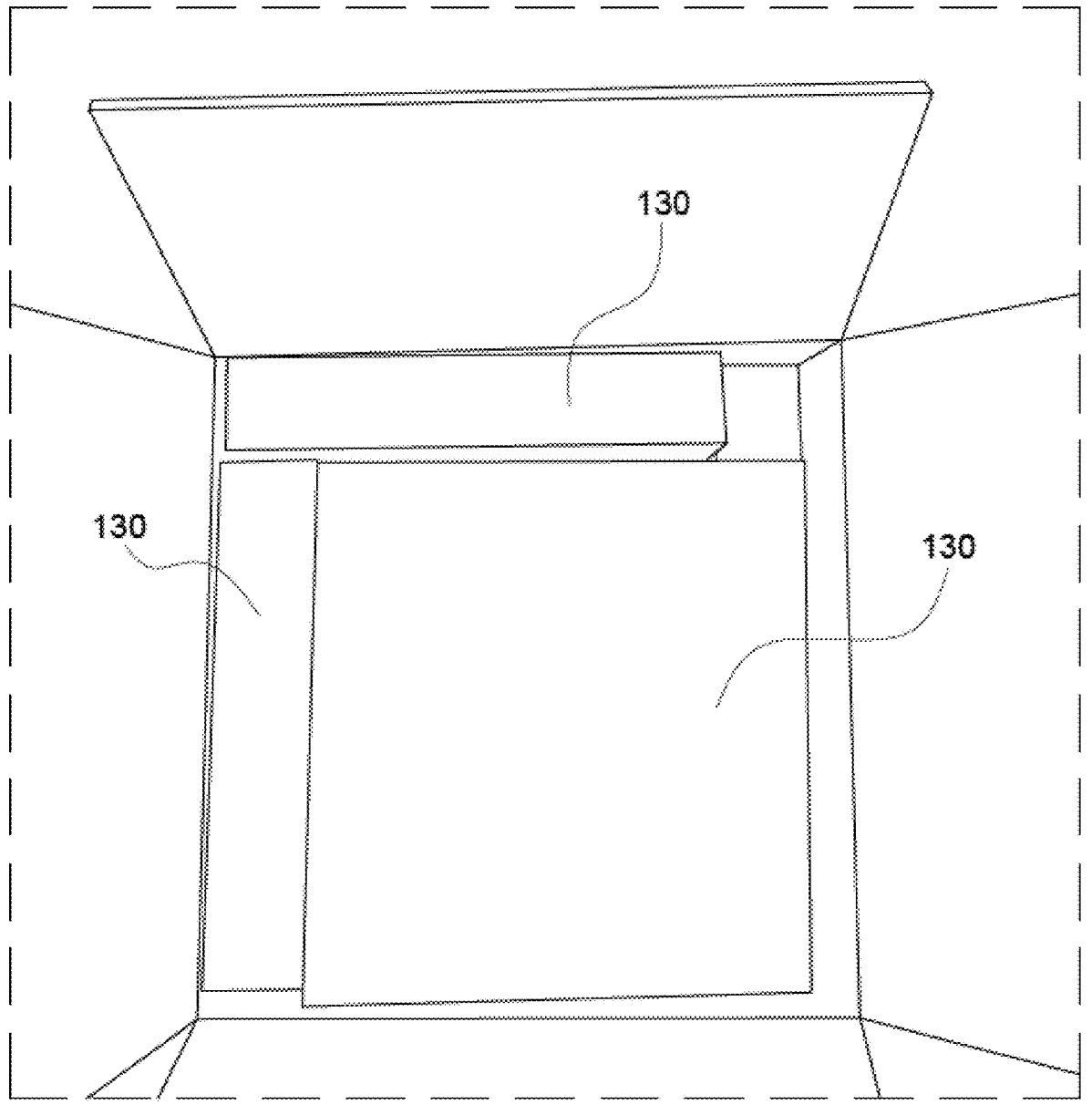
FIG. 6 is a top view of thermal insulation panels filled with a semi-solid biodegradable refrigerant gel arranged to encapsulate a perishable payload including a top panel in accordance with the present disclosure.

FIG. 6 is a top view of thermal insulation panels filled with a semi-solid biodegradable refrigerant gel arranged to encapsulate a perishable payload including a top panel, arranged in accordance with at least some embodiments presented herein. Those components in FIG. 6 that are labeled identically to components of FIGS. 1-5 will not be described again for the purposes of brevity. As shown in FIG. 6, thermal insulation panels 130 may be arranged within an overpack box to form an area to encapsulate a perishable payload including a top thermal insulation panel 130.

Referring to FIG. 3, optionally, semi-solid gel 90 may be placed into corrugated containers 120, which can be used as thermal insulation panels in shipping parcels 130 (FIGS. 5 and 6) which are plastic-free and optimized for payload space in the shipping parcel.

In other embodiments, gel 70 may be poured into corrugated container 120 (FIG. 3) and then closed (FIG. 4). Gel 70 may set and solidify into gel 90 within corrugated container 120 and closed corrugated container 120 will be sealed. Once a useful life of a cold pack consisting of semi-solid biodegradable refrigerant gel 90 is over, it may be composted in home or industrial settings or disposed of in normal waste streams, without any harm to the environment and producing less waste.

Figure 7:
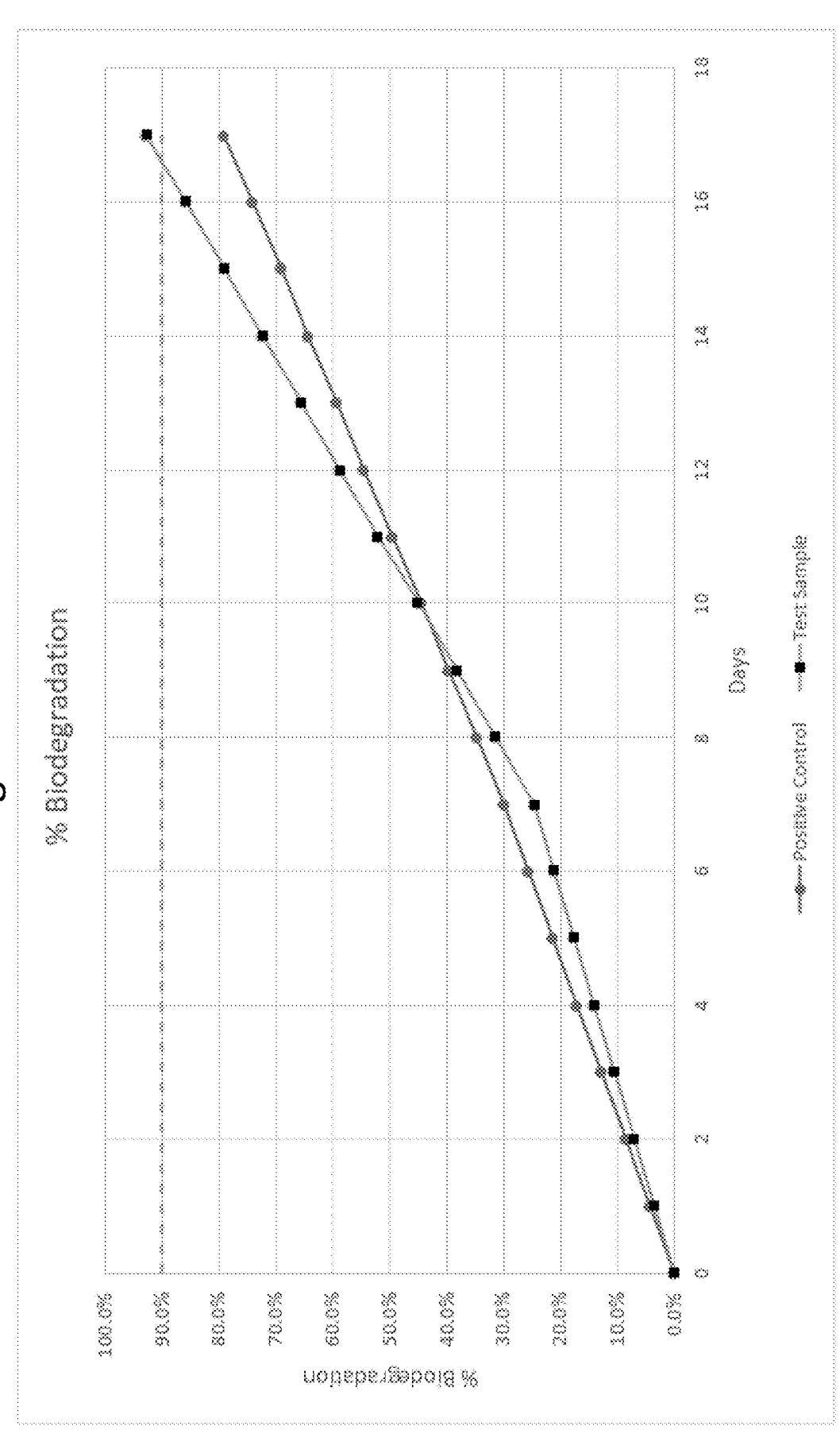
FIG. 7 is a graph of biodegradability of a semi-solid biodegradable refrigerant gel over time in accordance with the present disclosure.

FIG. 7 is a graph of biodegradability of a semi-solid biodegradable refrigerant gel over time arranged in accordance with at least some embodiments presented herein. Each data point in FIG. 7 represents the average results collected from three test reactors. Each test reactor contained 100 grams of Test Sample of semi-solid biodegradable refrigerant gel 90 from FIGS. 1-2. The data for FIG. 7 was acquired in a biodegradation study performed by an accredited U.S. Bio-Environmental Lab in accordance with ASTM D5338. ASTM D5338 test method determines the degree and rate of aerobic biodegradation of material exposed to a controlled-composting environment under laboratory conditions, at thermophilic temperatures. The aerobic composting takes place in an environment where temperature, aeration and humidity are closely monitored and controlled. This test method is designed to yield a percentage of conversion of carbon in the sample to carbon dioxide. The rate of biodegradation is monitored as well. This test method is equivalent to ISO 14855. To be considered biodegradable per ASMT D5338, the substance must achieve 90% conversion of carbon content into carbon dioxide within 180 days. The dashed line at 90% Biodegradation indicates a passing result. As shown in FIG. 7, semi-solid biodegradable refrigerant gel 90 achieved 90% conversion of carbon content into carbon dioxide within 17 days.

A device in accordance with the present disclosure may provide a semi-solid biodegradable refrigerant gel contained in low barrier material. A device in accordance with the present disclosure may provide a semi-solid biodegradable refrigerant gel which does not flow or leak. A device in accordance with the present disclosure may provide a refrigerant pack that does not include or require a high-barrier containment material.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

The invention claimed is:

1. A semi-solid biodegradable refrigerant gel comprising:
    water;
    sodium carboxymethyl cellulose;
    aluminum sulfate;
    sodium aluminum sulfate;
    sodium benzoate;
    potassium sorbate;
    citric acid; and
    sodium carbonate.

2. The semi-solid biodegradable refrigerant gel according to claim 1, wherein the gel is encapsulated in a paper material consisting of over 85% fiber content by weight.

3. The semi-solid biodegradable refrigerant gel according to claim 1, wherein the semi-solid biodegradable refrigerant gel includes:
    about 0.86% sodium carboxymethyl cellulose by weight relative to the water;
    about 0.019% aluminum sulfate by weight relative to the water;
    about 0.064% sodium aluminum sulfate by weight relative to the water;
    about 0.139% sodium benzoate by weight relative to the water;
    about 0.034% potassium sorbate by weight relative to the water;
    about 0.024% citric acid by weight relative to the water; and
    about 0.014% sodium carbonate by weight relative to the water.

4. The semi-solid biodegradable refrigerant gel according to claim 1, wherein the gel does not flow or leak.

5. The semi-solid biodegradable refrigerant gel according to claim 1, wherein the gel retains the shape of a container where the gel solidified.

6. The semi-solid biodegradable refrigerant gel according to claim 1, wherein the gel has a Latent Heat of Fusion >275 J/g and a eutectic point of about 0° Celsius.

7. The semi-solid biodegradable refrigerant gel according to claim 1, wherein the sodium aluminum sulfate has a different dissolution rate than the aluminum sulfate and is used in concert with the aluminum sulfate to achieve a specific pot-life.

8. The semi-solid biodegradable refrigerant gel of claim 1, wherein the gel has a pH above 4.0.

9. The semi-solid biodegradable refrigerant gel of claim 1, wherein the gel is utilized in a refrigerant pack.

10. A method of making a semi-solid biodegradable refrigerant gel comprising:

providing a chamber and a disperser proximate to the chamber;

depositing a predetermined amount of water into the chamber;

adding a blend of raw materials to the water via the disperser, wherein the blend of raw materials comprises:

sodium carboxymethyl cellulose;

aluminum sulfate;

sodium aluminum sulfate;

sodium benzoate;

potassium sorbate;

citric acid; and sodium carbonate;

mixing the blend of raw materials with the water to create a viscous liquid gel;

filling containers or molds with the viscous liquid gel or encapsulating the viscous liquid gel in an encapsulation material; and allowing the viscous liquid gel to set in the containers or molds or encapsulation material to form the semi-solid gel.

11. The method of claim 10, further comprising freezing the gel to create a cold pack.

12. The method of claim 10, wherein the encapsulation material includes a low-barrier containment material.

13. The method of claim 12, wherein the low-barrier containment material is rollstock material and is converted into a pouch or bag during a filling process by sealed seams.

14. The method of claim 11, wherein the low-barrier containment material is a paper material consisting of over 85% fiber content by weight.

\* \* \* \* \*